(No Model.)

A. BOLTZ.
PUZZLE.

No. 568,232. Patented Sept. 22, 1896.

WITNESSES:
C. E. Whitney.
C. Gersh.

INVENTOR
Adam Boltz.
BY
Edgar Tate
ATTORNEYS.

UNITED STATES PATENT OFFICE.

ADAM BOLTZ, OF NEW YORK, N. Y.

PUZZLE.

SPECIFICATION forming part of Letters Patent No. 568,232, dated September 22, 1896.

Application filed February 6, 1896. Serial No. 578,189. (No model.)

*To all whom it may concern:*

Be it known that I, ADAM BOLTZ, a citizen of the United States, and a resident of New York, in the county of New York and State of New York, have invented certain new and useful Improvements in Puzzles, of which the following is a specification, reference being had to the accompanying drawings, forming a part thereof, in which similar letters of reference indicate corresponding parts.

This invention relates to puzzles, and the object thereof is to provide an improved device of this class which is simple in construction, and the solution of which is difficult to those unacquainted with the method of its operation.

The invention is fully disclosed in the following specification, of which the accompanying drawings form a part, in which—

Figure 1:
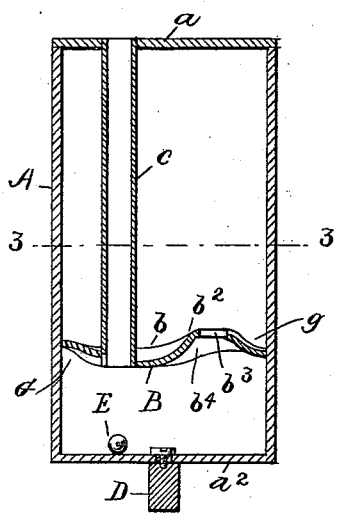
Figure 4:
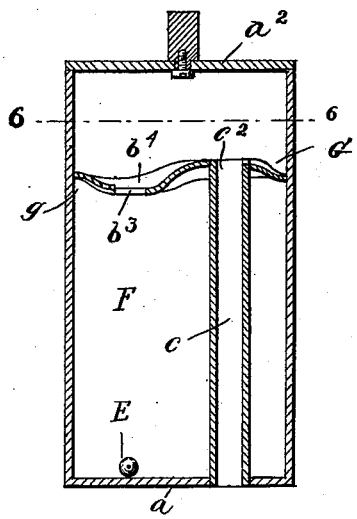
Figure 2:
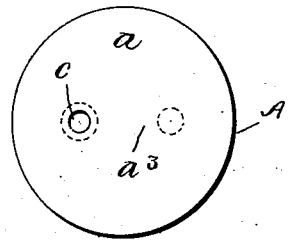
Figure 5:
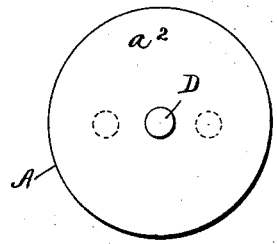
Figure 3:
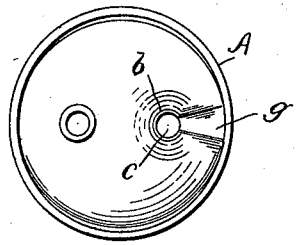
Figure 6:
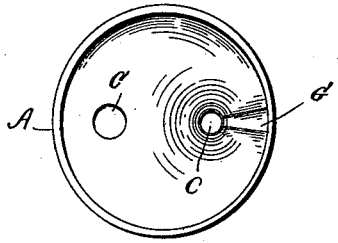

Figure 1 is a central vertical section of my improved puzzle; Fig. 2, a plan view thereof; Fig. 3, a section on the line 3 3 of Fig. 1; Fig. 4, a view similar to Fig. 1, showing the device inverted; Fig. 5, a plan view thereof, and Fig. 6 a section on the line 6 6 of Fig. 4.

In the practice of my invention I provide a cylindrical casing A, which may be composed of metal or of any desired material, and near one end of said casing is a diaphragm or partition which is of the form in cross-section shown in Fig. 1, and extending from one end $a$ through said partition is a tube C, which is open at both ends.

The partition B in the position shown in Fig. 1 is provided at one side thereof with a cup-shaped depression $b$, through the bottom of which the tube C passes, and with a raised portion $b^2$, which is provided with an aperture $b^3$.

On an examination of Figs. 1, 3, 4, and 6 it will be seen that a groove G extends from the opening $C^2$ of the tube C in the partition-plate B to the adjacent side of the casing A, and that a similar groove $g$ extends from the opening $b^3$ in said plate B to the adjacent side of the casing, these grooves being each curved upwardly over the inclined surface of the plate, and each being placed in communication with its respective openings.

When the device is inverted, as shown in Fig. 4, there will be a cup-shaped depression $b^4$ in the upper side of the partition B, formed by the raised portion $b^2$ and the end of the casing A opposite the end $a$, and the end $a^2$ of the casing A opposite the end $a$ is closed, as shown in Figs. 1 and 2, and I also in practice form in the upper side of the end $a$ a line $a^3$, which may be cut in the metal itself or painted thereon, or formed in any desired manner, and in the closed end $a^2$, and centrally thereof, I secure a plug or handle D, but this last element is immaterial and forms no part of this invention, and may or may not be employed, as desired.

I also employ a ball or spherical body E, which is of such size as to be passed through the tube C, and will also pass easily through the aperture or opening $b^3$, and the solution of the puzzle consists in manipulating the device so as to remove said ball or body therefrom after it has been passed through the tube C and through the opening $b^3$ into the chamber F. This solution is exceedingly difficult, especially to those who are unacquainted with the inner arrangement and the method of operation necessary to accomplish the same. It may be quickly and easily accomplished, however, by using the line $a^3$ as an aid and holding the casing with the end $a$ up and with the line $a^3$ extending directly toward the operator. In this position the ball E will rest in the groove $g$, and by gradually and slowly turning the casing from the operator the ball E will roll up the groove $g$ and into and through the opening $g^3$ into the bottom chamber, and then by inverting the casing and holding the same in the proper position the ball E will be lodged in the groove G, and by gently moving the end of the casing from the operator said ball will roll in said groove and into the pipe C, from which it will be discharged, as will be readily understood.

The casing A may be made of any desired material, and my invention is not limited to the material of which the device is composed or to the exact construction thereof, and I reserve the right to make all such alterations therein and modifications thereof as fairly come within the scope of the invention.

Having fully described my invention, I claim as new and desire to secure by Letters Patent—

1. The herein-described puzzle, which consists of a casing which is closed at both ends, a partition-plate located near one end thereof, a pipe which extends through the opposite end, and through said partition, said partition-plate being provided with a cup-shaped depression through which said pipe passes, and on the opposite end thereof with a similar depression in which is formed an opening or passage, and said partition being also provided adjacent to the end of the pipe with a groove which extends to the side thereof, and with a similar groove which extends from the other opening to the side of the casing, substantially as shown and described.

2. The herein-described puzzle, which consists of a casing which is closed at both ends, a partition-plate located near one end thereof, a pipe which extends through the opposite end, and through said partition, said partition-plate being provided with a cup-shaped depression through which said pipe passes, and on the opposite end thereof with a similar depression in which is formed an opening or passage, and said partition being also provided adjacent to the end of the pipe with a groove which extends to the side thereof, and with a similar groove which extends from the other opening to the side of the casing, and a ball or spherical body which is adapted to be passed through said pipe, and through said openings in said partition, substantially as shown and described.

3. The herein-described puzzle which comprises a cylindrical casing, each end of which is closed, a partition located therein near one end thereof, a tube which passes through one end and through said partition, said partition being provided with a cup-shaped depression through which said tube passes and which is located adjacent to one side thereof, and the opposite side of the partition being provided with a cup-shaped depression in the bottom of which is an opening, said cup-shaped partitions being formed on opposite sides of said partition, and said casing being provided with a ball or spherical body which is adapted to be passed through said tube and said opening in said partition, substantially as shown and described.

In testimony that I claim the foregoing as my invention I have signed my name, in presence of the subscribing witnesses, this 5th day of February, 1896.

ADAM BOLTZ.

Witnesses:
C. GERST,
A. C. McLOUGHLIN.